Aug. 26, 1969  K. G. ANDERSON  3,462,909
PACKAGING METHOD AND APPARATUS
Filed March 3, 1967  3 Sheets-Sheet 1
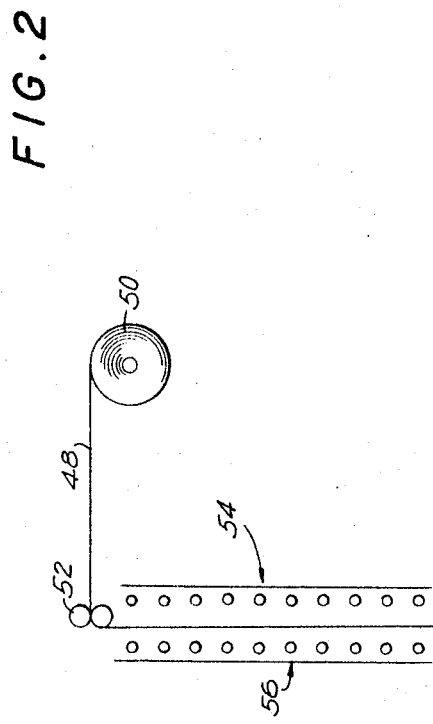
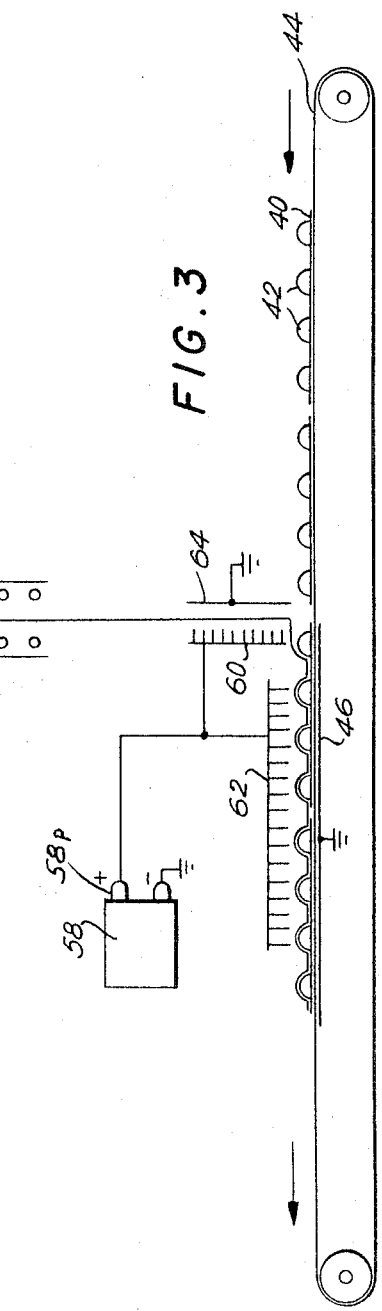
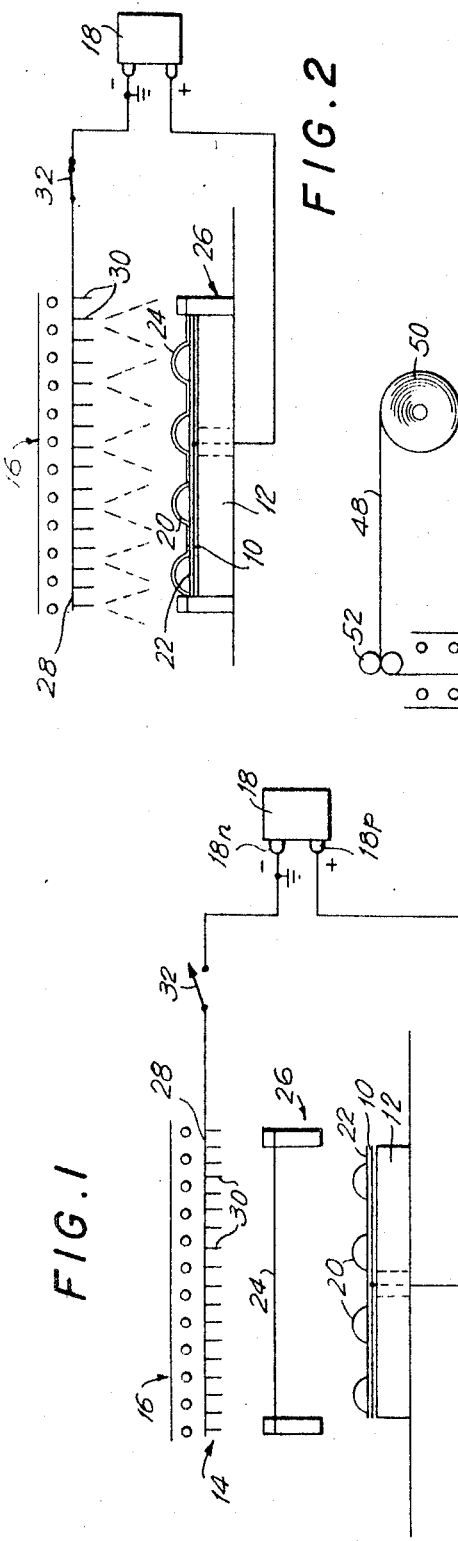
INVENTOR.
KELVIN GORDON ANDERSON
BY Harry Cohen
ATTORNEY Aug. 26, 1969    K. G. ANDERSON    3,462,909
PACKAGING METHOD AND APPARATUS
Filed March 3, 1967    3 Sheets-Sheet 2
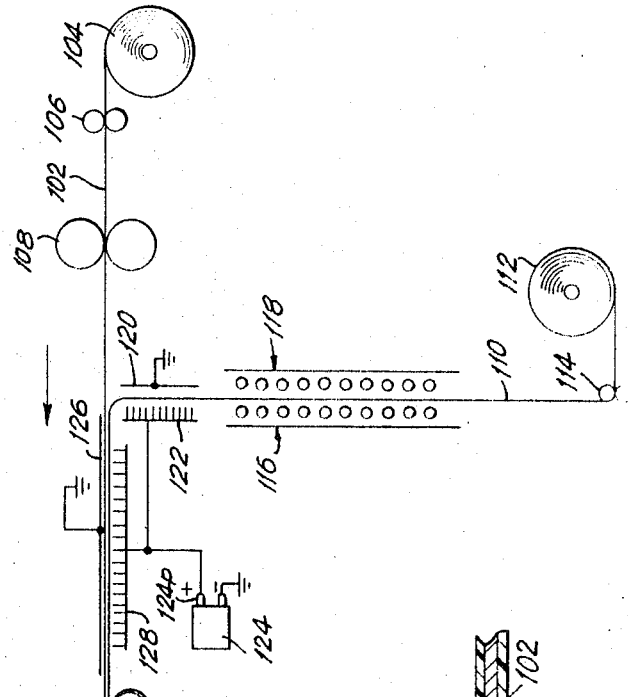
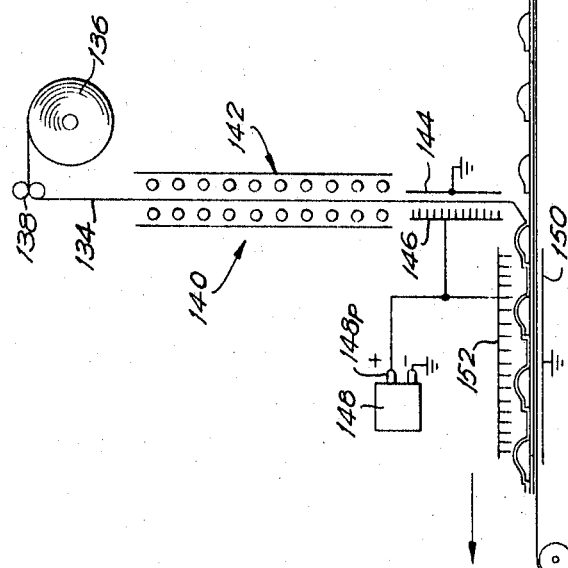
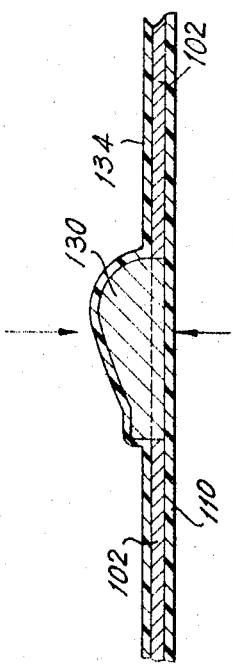
FIG. 4
FIG. 5
INVENTOR.
KELVIN GORDON ANDERSON
BY
ATTORNEY Aug. 26, 1969 K. G. ANDERSON 3,462,909
PACKAGING METHOD AND APPARATUS
Filed March 3, 1967 3 Sheets-Sheet 3
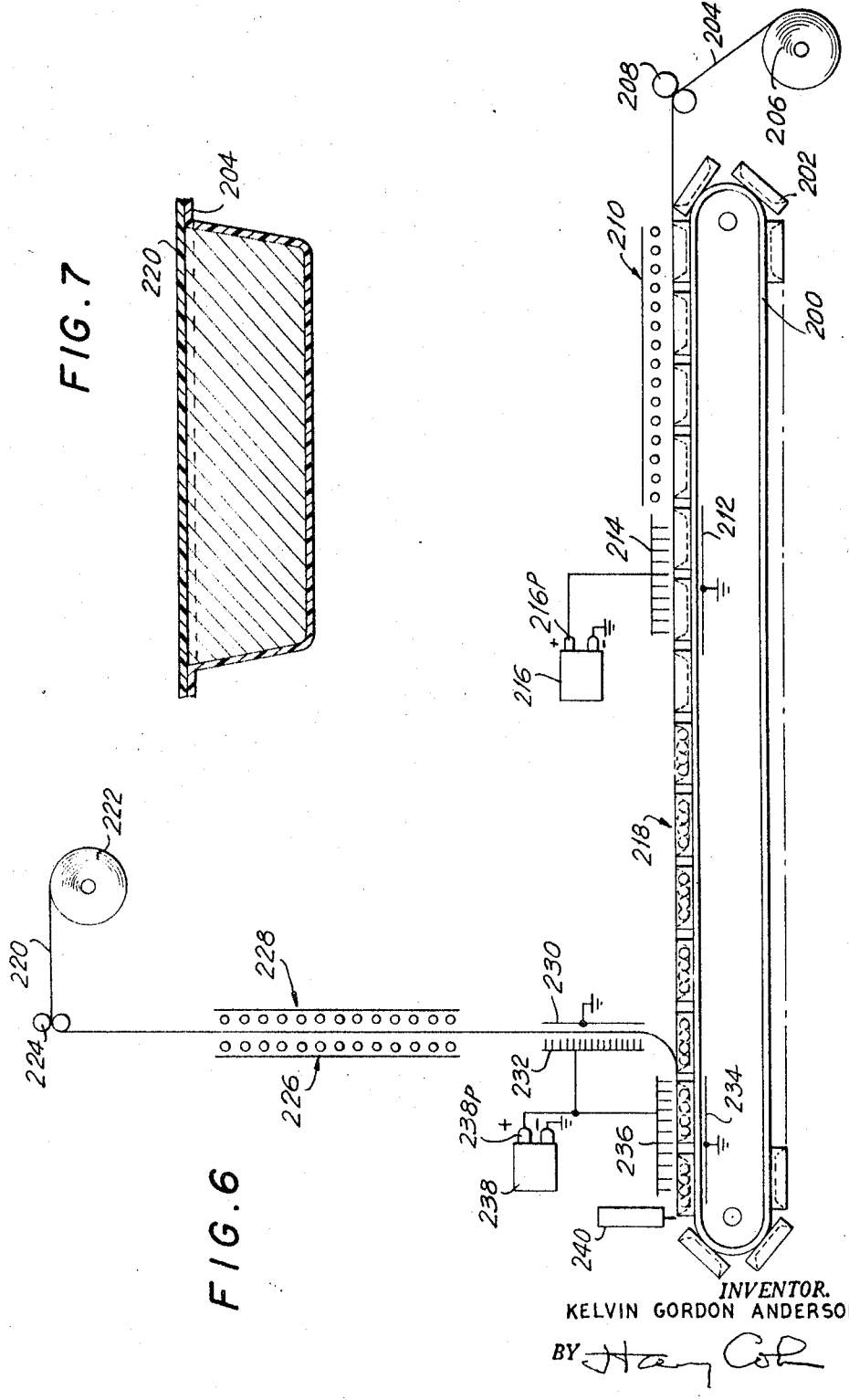
INVENTOR.
KELVIN GORDON ANDERSON
BY Harry Cole
ATTORNEY

United States Patent Office 3,462,909
Patented Aug. 26, 1969

3,462,909
PACKAGING METHOD AND APPARATUS
Kelvin G. Anderson, Bronx, N.Y., assignor to Weldotron Corporation, Newark, N.J., a corporation of New Jersey
Filed Mar. 3, 1967, Ser. No. 620,532
Int. Cl. B65b 9/04, 47/02
U.S. Cl. 53—41                                32 Claims

ABSTRACT OF THE DISCLOSURE

A sheet of plastic film is softened by heating and is disposed with a package support between two electrodes. One of the electrodes produces a local electrostatic stress concentration in the ambient atmosphere. An electrical potential is provided between the electrodes and is adequate for local ionization of the atmosphere adjacent the one of the electrodes and provides a charge on the plastic film. The electrostatic force developed between the electrodes and the plastic film moves the softened film to closely conform to the contours of an article on the support and against the support.

BACKGROUND OF THE INVENTION

Field of the invention

This invention relates to the packaging of articles within wrappers of plastic film; and particularly to the substantially air tight adherence of a plastic film to a support therefor.

Description of the prior art

Articles are frequently mounted on a support, such as a display card, by a plastic film, in a skin package. The usual skin packaging machine operates on a vacuum forming principle, substantially as follows:

The article to be packaged is disposed on a card, which card is positioned in a vacuum box. A sheet of plastic film is peripherally clamped in a frame and is heated. When the film has been heated to a sufficiently soft and pliable condition, it is brought into contact with the card, and the article disposed on the card, while a vacuum is simultaneously drawn through the card under the film. The vacuum serves to cause the film to closely conform to the contours of the article and the card. The film is caused to adhere to the card either by pre-coating the card or the film with adhesive. In order to draw a vacuum through the card, the card must either be porous, or be made porous by means of a plurality of minute perforations. If the card is naturally porous, and is coated with adhesive, great care must be taken to prevent the adhesive from destroying all of the porosity. This is accomplished by applying the adhesive discontinuously over the surface of the card so as to leave an adequate percentage of the surface in the porous state for drawing the vacuum therethrough while providing enough adhesive to hold the film to the card.

It is an object of this invention to obtain the same final result provided by the conventional vacuum skin packaging technique, but without the use of vacuum; thus eliminating the need for a porous card, that is, a card which is either naturally porous or which has been rendered porous by perforations.

Another object is to eliminate the need for an air-tight vacuum box and a clamp frame therefor.

Yet another object is to perform skin packaging on a non-intermittent, continuous flow basis.

SUMMARY

A feature of this invention is the provision of an electrostatic field to develop a charge on, and to cause a film to closely conform to, the contours of a support medium. The support medium may be a card with an article disposed thereon.

The use of an electrostatic field renders the provisions of a vacuum and porosity in the card unnecessary.

BRIEF DESCRIPTION OF THE DRAWING

These and other objects, features and advantages of the invention will become apparent from the following specification thereof, taken in conjunction with the accompanying drawing in which:

FIG. 1 is a diagram of a skin packaging apparatus embodying this invention, showing the parts thereof at the start of a packaging operation;

FIG. 2 is a diagram of the apparatus of FIG. 1, showing the heated film disposed on the card and articles supported thereon;

FIG. 3 is a diagram of a modification of the apparatus of FIG. 1, for the non-intermittent, continuous packaging of articles on individual cards;

FIG. 4 is a diagram of a modification of the apparatus of FIG. 1 for the non-intermittent, continuous packaging of articles on a continuous card;

FIG. 5 is a cross-sectional view of a package formed by the apparatus of FIG. 4;

FIG. 6 is a diagram of a modification of the apparatus of FIG. 1 for the non-intermittent, continuous packaging of articles in continuously formed plastic receptacles; and FIG. 7 is a cross-sectional view of a package formed by the apparatus of FIG. 6.

DESCRIPTION OF THE PREFERRED EMBODIMENT

Turning now to FIG. 1, it will be seen that the packaging apparatus of this embodiment comprises a conductive plate 10 which is supported by a dielectric plate 12, a multipoint, planar array electrode 14, a bank of radiant heaters 16, and a high voltage direct current power supply 18. The article or articles 20 to be packaged in a single unit are disposed on a card 22, which card in turn, is disposed on the conductive plate 10. A sheet of film 24 which is to be disposed onto the articles and the card is peripherally supported in a clamp-frame 26.

The sheet of film is initially supported away from the articles and the card adjacent the bank of heaters, by which bank of heaters the film is heated to a soft and pliable condition. The bank of heaters may comprise any suitable source of radiant heat such as electrical resistance rods or tapes.

The planar array of electrodes 14 is disposed between the bank of heaters 16 and the sheet of film 24. The array must permit the passage of the radiant heat from the bank of heaters to the sheet of film. The array may advantageously comprise a group of straight metal rods or tubes 28, each rod or tube having a series of sharp points 30 projecting therefrom. The spacing of the points is not critical, and typically may be one-half inch between points.

A high D.C. potential is then applied between the multipoint, planar array electrode 14 and the conductive plate 10. The choice of polarity is determined by the convenience of construction. As here shown, the multipoint planar array electrode is coupled to the negative terminal 18n of the D.C. power supply 18, which negative terminal is grounded. The conductive plate 10 is connected to the positive terminal 18p. This arrangement is convenient as it precludes the possibility of arcing between the multipoint electrode and the bank of heaters. However, it is within the scope of this invention to connect the multipoint electrode to the positive terminal 18, and the conductive plate 10 to the negative terminal 18n, in which case the dielectric plate 12 could have been eliminated. The magnitude of the D.C. potential between the multipoint electrode 14 and the conductive plate 10 is not critical so long as it is adequate to produce local ionization of the atmosphere in the vicinity of the electrode points, and a charge on the film, but not an arc-over to the conductive plate. I have found 40 to 50 kilovolts to be adequate for the half-inch spacing between points.

The D.C. potential is initially disconnected from the electrode 14 by an open switch 32, and a sheet of film 24 is clamped in the frame 26 which is in its raised position adjacent the banks of heaters 14. The heaters are energized by a suitable source, not shown, to radiate heat through the multipoint, planar array electrode 14, to the sheet of film. When the film has been heated to an adequately pliable condition, the frame 26 is lowered to bring the sheet of film into contact with the card 22 and the articles 20 therein, as shown in FIG. 2. Concurrently, the switch 32 is closed to couple the power supply 18 to the electrode 14 to provide an electrostatic field between the electrode 14 and the conductive plate 10, and local ionization of the atmosphere of the electrode, which develops a charge on the sheet of film 24, and which forces the pliable sheet of film 24 to closely conform to the card 22 and the articles 20 thereon. Either the surface of the film may be pretreated to give it an adhesive characteristic, or the sheet of film or the card may be precoated with adhesive, and the closely conforming sheet of film adheres to the card to provide a skin-pack package without the use of a vacuum, or the need for pores through the card.

A modification for continuously packaging individual cards with a continuous web of film is shown in FIG. 3. Here, a series of cards 40, each with a respective plurality of articles 42 disposed thereon, is advanced by a conveyor belt 44 from right to left. A conductive plate 46 is disposed below the upper run of the conveyor belt 44 and is grounded. A continuous web of film 48 is unwound from a supply roll 50 by a pair of feed rollers 52 at a rate in phase with the advance of the cards on the conveyor belt. The web is passed between two banks of heaters 54, 56 which are energized by suitable sources, not shown. The banks of heaters provide a heating zone which rapidly heats the web to the proper softness. The heating may be conducted from one side only, but the two side heating here shown is preferable in providing a higher heating rate and permitting a faster film, and, therefore, conveyor belt advance. The web of film from the heating zone is brought into contact with the continuously advancing cards 40 and respective articles 42. A high voltage D.C. power supply 58 has one terminal, here shown as its positive terminal 58p, connected to two multipoint, planar array electrodes 60, 62. The electrode 60 is disposed at the bottom of the drop of the web from the heating zone of the left side of the web. A conductive plate 64, which is grounded, is disposed at the right side of the web. An electrostatic feed is developed between the electrode and the plate which serves to control the angle at which the heated web of the film feeds onto the conveyor 44 without the necessity of mechanical guides which would have to contact the softened film. The electrode 62 is disposed above the conveyor 44 over the conductive plate 46 to develop an electrostatic field which causes the web of film to closely conform to the cards and respective articles as they pass through the field.

It should be noted that while individually cut cards 40 have been here shown, the card material, if so sufficiently flexible, also can be continuously fed as a web from a supply roll onto the conveyor, be loaded with its articles, and be passed through the electrostatic field. In each case the continuous web of packages can be separated into individual packages by a flying shear, or other suitable transverse severing means, not shown, located downstream of the electrostatic field. If the articles and the transverse severing means are omitted, the apparatus can serve for the continuous lamination of a web of film to a web of other material, such as cardboard stock, or other film.

It should be appreciated that the electrostatic skin packaging technique of this invention, as for example, illustrated in FIG. 3, is highly advantageous for the packaging of perishable food. The packaging of perishable food has not been feasible with the known vacuum skin packaging technique, since this requires a porous card or other container for the drawing of the vacuum, with the result that it is impossible to form an air tight package. On the contrary, with the electrostatic skin packaging technique of this invention an impermeable card or other container may be used, and if the web of film is also impermeable a hermetically sealed package can be made. Further, since the film is forced to conform very closely to the food, all excess air is automatically expelled, and the resultant package is the equivalent of the package produced by the process of removing air from a package by applying an external vacuum.

The apparatus shown in FIG. 4 provides a sandwich-package wherein the card and its articles are packaged between two webs of film. This permits a skin package where the contained article is visible from both the top and bottom. A conveyer belt 100 advances from right to left. A web 102 of flexible cardboard stock is drawn off a supply roll 104 by a pair of feed rollers 106. The web passes between a pair of rotary die cutters 108 which blanks out sections of the cardboard conforming to the outline of the article, and onto the upper run of the conveyor belt 100. A lower web of film 110 is drawn off a supply roll 112 by a pair of feed rollers 114. The web of film 110 passes through a heating zone, here shown as provided by two opposed banks of heaters 116, 118, energized by a source which is not shown. The heated web passes between a conductive plate 120 which is connected to ground, and a multipoint, planar array electrode 122 which is connected to the positive terminal 124p of a high voltage D.C. supply 124, the negative terminal of which is grounded. The electrode 122 and the conductive plate 120 serve as an electrostatic guide for the web. The heated web of film 110 passes from the electrostatic guide onto the underside of the web of cardboard stock; and between a conductive plate 126 which is disposed above the web of cardboard stock and is connected to ground, and a multipoint, planar array electrode 128 which is connected to the positive terminal 124p of the D.C. supply 124. The electrode 128 and the plate 126 serve to force the web of film against the web of cardboard stock to which it is adhered by suitable adhesive previously applied to one of the webs. The right, in-feed end of the upper run of the conveyor belt 100 serves as a loading zone at which articles 130 are disposed in the cutouts through the web of cardboard stock 102 onto the underlying web of film 110. An upper web of film 134 is drawn off a supply roll 136 by a pair of feed rollers 138. The web passes through a heating zone, here shown as provided by two banks of heaters 140, 142, energized by a source which is not shown. The heated web passes between a conductive plate 144 which is connected to ground, and a multipoint, planar array electrode 146 which is connected to the positive terminal 148p of a high voltage D.C. supply 148, whose negative terminal is grounded. The electrodes 146 and the conductive plate 144 serves as an electrostatic guide for the web. The heated web of film 134 passes from the electrostatic guide onto the web of cardboard stock 102 and the article 130 disposed thereon; and between a conductive plate 150 which is disposed below the upper run of the conveyor belt and is connected to ground, and a multipoint, planar array electrode 152 which is connected to the positive terminal 148p of the D.C. supply. The electrode 152 and the plate 150 serve to force the web of film against the web of cardboard stock and the articles disposed thereon, to which web it is adhered by suitable adhesive previously applied to one of the webs. A flying shear, not shown, disposed to the left of the conveyor belt may be used to cut the continuous package into unit packages. A unit package is shown in cross-section in FIG. 5.

The apparatus shown in FIG. 6 provides a sandwich package wherein the articles are packaged between two webs of film, the lower web being formed into rigid or semi-rigid trays or containers. A conveyor 200 has a series of mold cavities 202 pivotally attached thereto. These cavities are advantageously made of a dielectric material. A web of film 204 is drawn off a supply roll 206 by a pair of feed rolls 208. The web passes onto the series of mold cavities 202 and through a heating zone provided by a bank of heaters 210 energized by a source which is not shown. The heated web of film and the series of mold cavities pass between a conductive plate 212 which is coupled to ground, and a multipoint, planar electrode 214 which is coupled to the positive terminal 216p of a high voltage D.C. supply 216. The electrode and the conductive plate serve to force the web of film 204 to conform to the shape of the mold cavities 202. The web of film, as formed into a series of cavities, passes into a loading zone 218 in which each cavity is filled with articles. A web of film 220 is drawn from a supply roll 222 by a pair of feed rollers 224. The web passes through a heating zone here shown as provided by a pair of opposed banks of heaters 226, 228, energized by a source which is not shown. The heated web passes between a conductive plate 230 which is connected to ground, and a multipoint, planar array electrode 232 which is connected to the positive terminal 238p of a high voltage D.C. supply 238, whose negative terminal is grounded. The electrode 232 and the conductive plate 230 serve as an electrostatic guide for the web. The heated web of film 226 passes from the electrostatic guide onto the series of cavities and the articles or material disposed therein; and between a conductive plate 234 which is disposed below the upper run of the conveyor belt and is connected to ground, and a multipoint, planar array electrode 236 which is connected to the positive terminal 238p of the D.C. supply. The electrode 236 and the plate 234 serve to force the web of film against the upper lips or flanges of the series of cavities, to which lips it is adhered by suitable adhesive previously applied to one of the webs. A flying shear 240 disposed at the discharge end of the conveyer belt is used to separate the unit packages. A unit package is shown in cross-section in FIG. 7.

Suitable apparatus is utilized with the apparatus of the present invention to form a series of apertures in the web of cardboard stock 102 of FIG. 4, for example, each of which apertures accommodates an article 130.

What is claimed is:

1. A method of skin packaging an article, said method comprising:
   disposing an article to be packaged on a package support;
   heating a sheet of plastic film to soften said film;
   disposing the plastic film and the package support between two electrodes, one of which electrodes is shaped to produce a local electrostatic stress concentration in the ambient atmosphere;
   providing an electric potential between said two electrodes which is adequate to provide local ionization of the atmosphere adjacent said one of said electrodes and to provide a charge on said plastic film, but not adequate to provide an arc-over between said two electrodes whereby an electrostatic force is developed between said electrodes and said plastic film which moves said softened plastic film to closely conform to the contours of said article and against said package support.

2. A method according to claim 1, wherein said one electrode is formed with projections to provide localized ionization thereabout.

3. A method according to claim 1, wherein said one electrode is connected to ground.

4. A method according to claim 1, wherein said other of said electrodes is connected to ground.

5. A method according to claim 1, wherein said other of said electrodes is formed relatively smooth and planar to preclude ionization thereabout when operating at said electric potential between said electrodes.

6. A method according to claim 1, wherein said sheet of plastic film is initially disposed adjacent a heat source for being heated, and subsequently, when heated, is disposed over the article being packaged, and finally, when so disposed over said article, is disposed between said two electrodes.

7. A method according to claim 1, of continuously applying a first web of plastic film to a second web of support material, wherein said first and second webs are continuously brought together and advanced between said electrodes.

8. A method according to claim 1, wherein at least one of the group comprising said plastic film and said support has a mating surface with an adhesive characteristic, whereby said plastic film adheres to said support.

9. A method according to claim 1, of deflecting the direction of advance of a web of plastic film along a path without mechanically touching said web, wherein said web is advanced longitudinally along said path, at the point on the path whereat said direction of advance is to be deflected, said web is advanced between said two electrodes, a transverse electrostatic force is developed between said electrodes and said web.

10. A method according to claim 9, further including grounding said other of said electrodes.

11. Apparatus for skin packaging an article, said apparatus comprising:
    two electrodes, one of which is shaped to produce a local electrostatic stress concentration in the ambient atmosphere when energized at a given electric potential;
    means for disposing an article to be packaged on a package support medium means for disposing said support medium and said article between said two electrodes;
    means for heating a sheet of plastic film to soften said film;
    means for disposing said sheet of plastic film between said support medium and said one of said electrodes; and
    means coupled to said two electrodes for providing said given electric potential therebetween, thereby providing local ionization of the atmosphere adjacent said one of said electrodes and an electric charge on said plastic film, and developing an electrostatic force between said electrodes and said plastic film which moves said softened plastic film to closely conform to the contour of said article and against said package support medium.

12. Apparatus according to claim 11, wherein said one of said electrodes is substantially planar with a plurality of spaced projections extending therefrom towards said other of said electrodes.

13. Apparatus according to claim 12, wherein said one of said electrode is formed of a plurality of spaced elongated elements in a planar array, each of said elongated elements having a plurality of said spaced projections extending therefrom.

14. Apparatus according to claim 12, wherein said one of said electrodes is perforate.

15. Apparatus according to claim 11, wherein said other of said electrodes is substantially planar and relatively smooth surfaced.

16. Apparatus according to claim 11, further comprising a source of radiant heat, and wherein said means for disposing said sheet of plastic film is adapted to initially dispose said sheet adjacent said source of radiant heat and to subsequently dispose said sheet adjacent said package support medium.

17. Apparatus according to claim 14, further including a source of radiant heat disposed to radiate heat through said perforate one of said electrodes to said sheet of plastic film.

18. Apparatus according to claim 11, wherein said means for disposing said sheet of plastic film between said support medium and said one of said electrodes comprise a conveyor belt having an upper run disposed under said one of said electrodes and over said other of said electrodes.

19. Apparatus according to claim 18, wherein said sheet of plastic is a continuous web of plastic film which is continuously advanced onto said support medium on said upper run of said conveyor belt and transported between said two electrodes.

20. Apparatus according to claim 19, further including guide means for guiding, without mechanically touching, said continuous web of plastic film onto said upper run of said conveyor belt.

21. Apparatus according to claim 20, further including heating means for heating said continuous web of plastic film as it advances from a source to said guide means.

22. Apparatus according to claim 21, wherein
said guide means includes an additional two electrodes, between which said continuous web of plastic film passes, one of which is shaped to produce a local electrostatic stress concentration in the ambient atmosphere when energized at a given electric potential, and
means coupled to said additional two electrodes for providing said given electric potential therebetween, thereby providing local ionization of the atmosphere adjacent said one of said electrodes and an electric charge on said web, and developing an electrostatic force said electrodes and said web which guides said web away from said one of said electrodes.

23. A method according to claim 9, wherein said package support material comprises a continuous web of cardboard-like material.

24. A method according to claim 9, wherein said package support means comprises a continuous web of thermoplastic material.

25. A method according to claim 9, further including continuously applying an additional web of plastic film to said second web of support material, whereby said second web is sandwiched between said first and additional webs.

26. A method according to claim 25, further including forming a series of apertures in said second web, each to accommodate an article, and disposing an article in each respective aperture after applying said additional web of film and before applying said first web of film.

27. A method according to claim 24, further including preforming said second web of thermoplastic material into a series of containers before applying said first web thereto.

28. Apparatus according to claim 19, wherein said package support medium comprises a continuous second web of cardboard-like material.

29. Apparatus according to claim 19, wherein said package support medium comprises a continuous second web of thermoplastic material.

30. Apparatus according to claim 19, further including means for continuously applying an additional web of platsic film to said second web of support medium whereby said second web is sandwiched between said first and additional web.

31. Apparatus according to claim 20, further including means for forming a series of apertures in said second web, each for accommodating an article.

32. Apparatus according to claim 29, further including mold means for preforming said second web of thermoplastic material into a series of containers before applying said first web thereto.

References Cited

UNITED STATES PATENTS

| | | | |
|---|---|---|---|
| 2,385,873 | 10/1945 | Melton | 156—272 X |
| 3,048,088 | 8/1962 | Fischer et al. | 226—94 X |
| 3,196,063 | 7/1965 | Poquin et al. | 156—272 X |
| 3,204,384 | 9/1965 | Dallas | 53—141 X |
| 3,318,751 | 5/1967 | Ungerer et al. | 156—380 |
| 3,323,794 | 6/1967 | Brandt | 226—94 X |
| 3,323,965 | 6/1967 | Hanle et al. | 156—272 X |
| 3,329,549 | 7/1967 | Vilutis | 156—272 |

TRAVIS S. McGEHEE, Primary Examiner

U.S. Cl. X.R.

53—141, 184; 156—272, 380; 226—94